Patented Aug. 19, 1924.

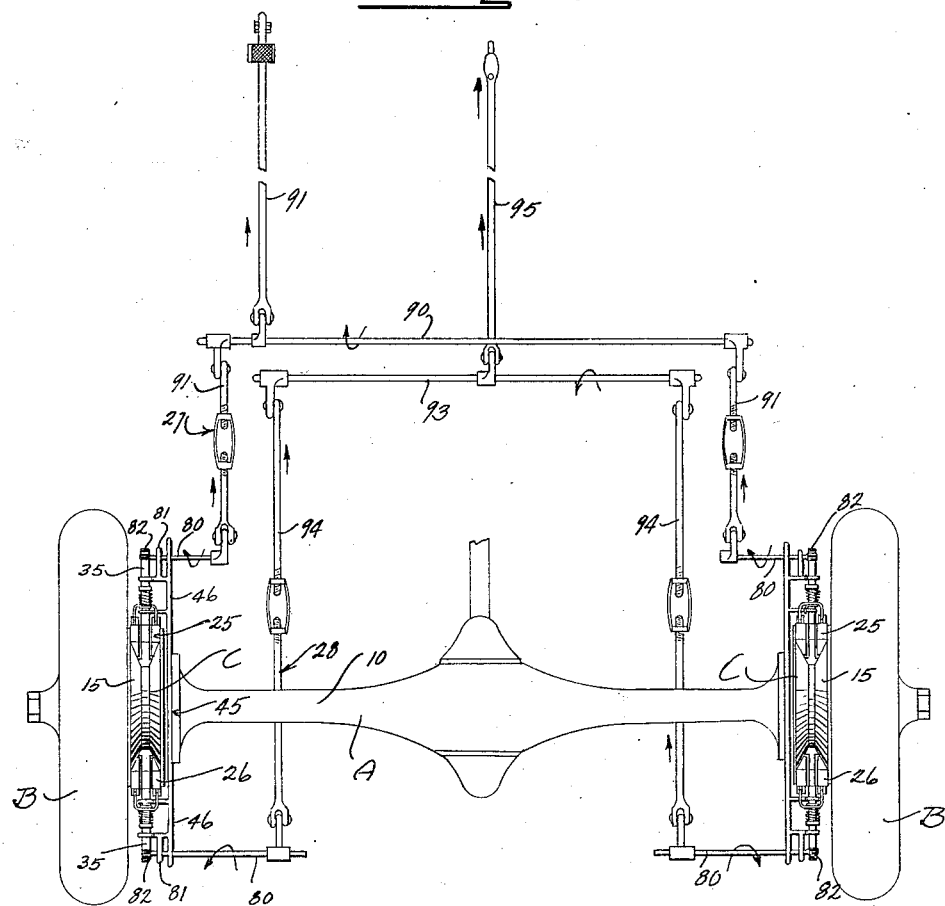

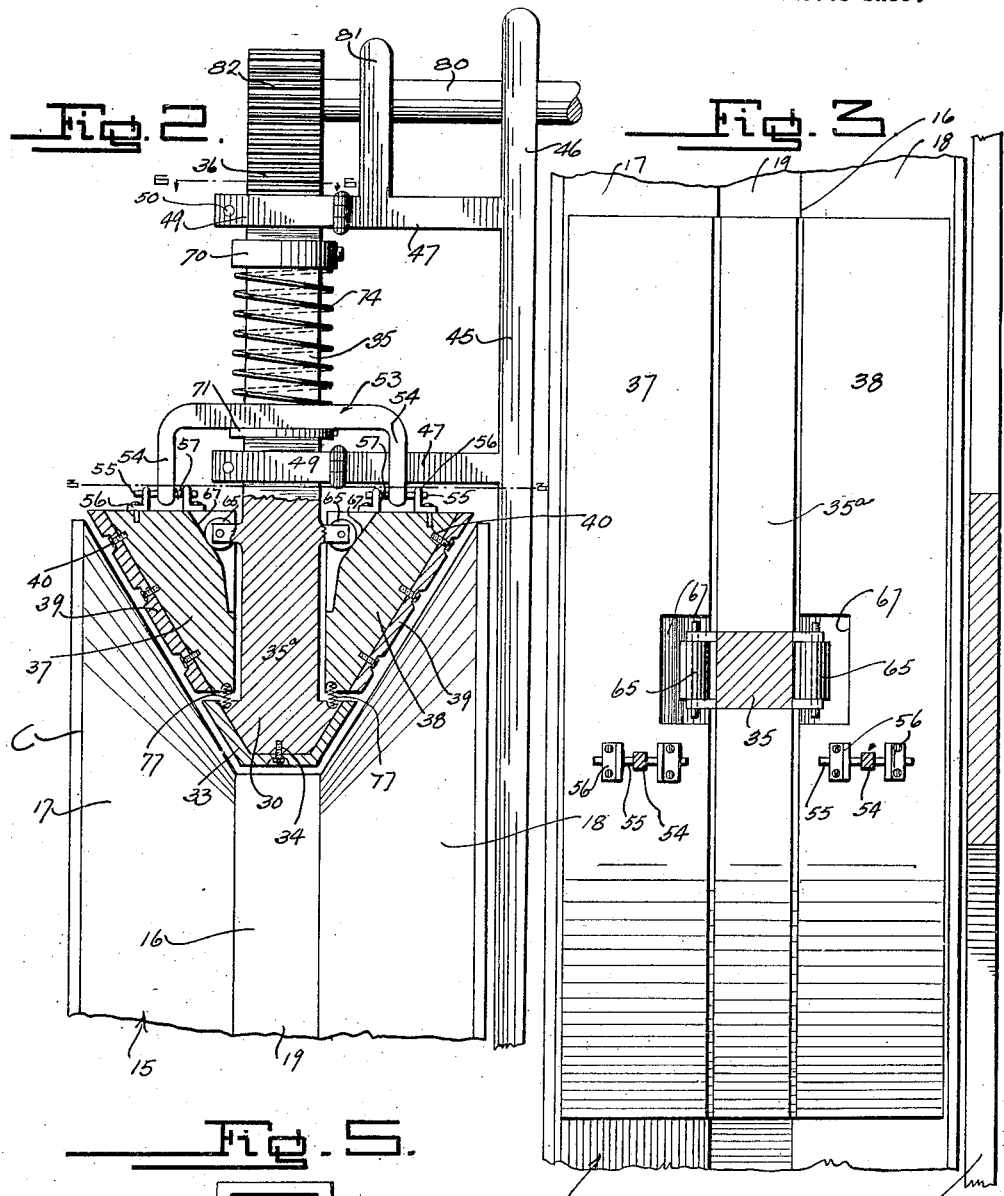

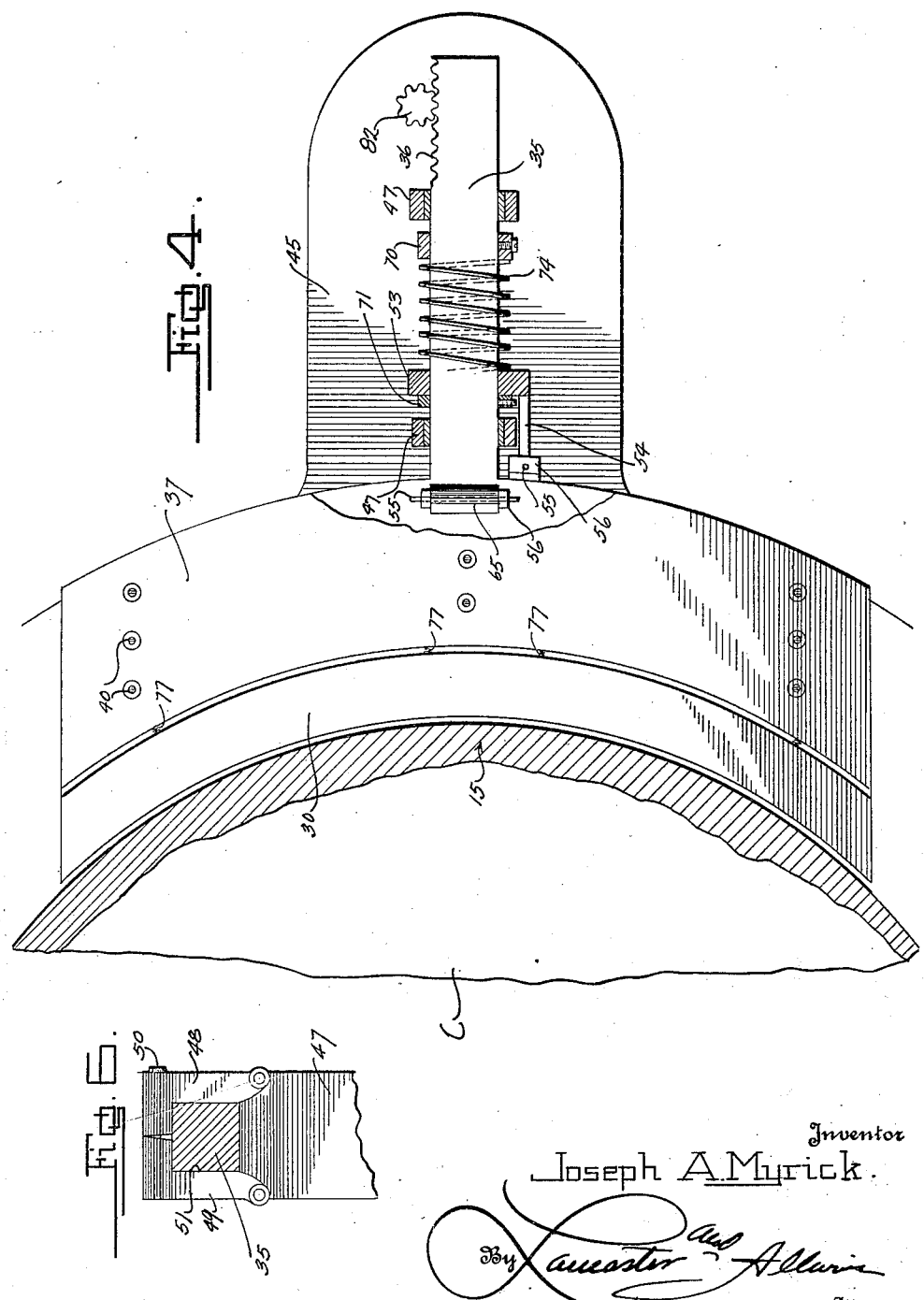

1,505,216

UNITED STATES PATENT OFFICE.

JOSEPH A. MYRICK, OF MARION, NORTH CAROLINA.

BRAKE CONSTRUCTION.

Application filed May 7, 1923. Serial No. 637,326.

*To all whom it may concern:*

Be it known that I, JOSEPH A. MYRICK, a citizen of the United States, residing at Marion, in the county of McDowell and State of North Carolina, have invented certain new and useful Improvements in Brake Constructions, of which the following is a specification.

This invention relates to improvements in brake constructions.

The primary object of this invention is the provision of a very effective and durable type of brake construction, particularly well adapted for use upon the traction wheels of automotive vehicles.

A further object of this invention is the provision of a brake construction, embodying means to obtain a maximum frictional braking effect upon a brake wheel, the brake shoe to attain this end being sectionally formed.

A further object of this invention is the provision of a brake construction of the above mentioned character embodying novel operating means.

Other objects and advantages of this invention will be apparent during the course of the following detailed description.

In the accompanying drawings, forming a part of this specification, and wherein similar reference characters designate corresponding parts throughout the several views:

Figure 1 is a plan view of the rear running gear of an automotive vehicle, showing the traction wheels thereof and the improved brake construction as associated therewith.

Figure 2 is an enlarged fragmentary view, partly in section, showing novel cooperating features of the improved brake construction.

Figure 3 is an enlarged fragmentary cross sectional view, taken substantially on the line 3—3 of Figure 2.

Figure 4 is an enlarged fragmentary view, partly in cross section, showing novel cooperating details of the improved brake construction.

Figure 5 is a plan view of a detail used in this invention.

Figure 6 is a cross sectional view, taken substantially on the line 6—6 of Figure 2.

In the drawings, wherein for the purpose of illustration is shown but the preferred embodiment of this invention, the letter A may generally designate the rear runing gear of an automotive vehicle or the like, which may include traction wheels B of any approved construction having improved brake constructions C associated therewith.

Referring to the running gear A, the same may include the housing 10, within which the axle and differential are encased for connection to the traction wheels B.

Referring to one of the brake constructions C, the same preferably includes a brake wheel or drum 15 of any approved material or construction, provided inwardly of its outer periphery with a substantially V-shaped groove 16. The groove 16 is so formed about the brake wheel 15 as to provide the side surfaces 17 and 18 converging toward the axis of the brake wheel 15, and terminating at the bottom 19 of the groove 16; said bottom 19 being an annular surface circumferentially about the wheel 15. The brake wheel 15 is of course secured in any approved manner to the hub or spoke structure of the traction wheels B as to rotate therewith.

Referring to the braking arrangement upon the wheel 15, it is preferred to provide similarly constructed brake shoe constructions 25 and 26 at diametrically opposed points in the groove 16 of each wheel 15, and with which operating mechanisms 27 and 28 respectively may be provided.

Each of the brake shoe constructions 25 and 26 includes a segmental shoe section 30, which is substantially V-shaped in cross section and operates in the lower part of the groove 16 over the bottom 19 of the groove, and for a short distance at the inner parts of the converging sides 17 and 18, substantially as is illustrated in Figure 2 of the drawings. The shoe section 30 is provided with lining 33 of any approved type thereon, connected thereto as by countersunk screw elements 34. It is preferred to provide a stem or shaft 35 rigid or integral with the shoe section 30, which extends radially outwardly in horizontal manner from the brake drum 15, and is provided with a series of rack teeth 36 upon the top surface thereof at its outer end, for cooperation with the operating means to be subsequently described.

The shoe construction furthermore includes side sections 37 and 38 for cooperation outwardly of the inner shoe section 30, and respectively over the converging groove sides 17 and 18. The sides of the sections 37 and 38 which face the converging sides 17 and 18 of the wheel groove 16 are preferably provided with lining 39 of any approved type, suitably secured to said shoe sections by counter sunk screw elements 40. From this description of the shoe construction it will be seen that the same is sectional, and in cross sections said sections provide a substantially V-shaped structure, which may cooperate in expansible manner within the annular groove of the brake wheel.

Referring to the means for supporting the brake shoe constructions upon the brake wheel 15, the same preferably comprises a supporting spider 45, which is connected to the axle housing 10, and provides supporting arms 46 which extend forwardly and rearwardly of the housing 10.

Each of the supporting arms 46 are provided with brackets 47 extending at right angles thereto toward the traction wheel, substantially as is illustrated in the drawings; the outer ends of the brackets 47 on each arm 46 providing a pair of hingedly connected arms 48 and 49, which when connected together by a bolt or analogous securing element 50 provide an opening 51 therethrough to slidably receive the shaft or stem 35 of a brake shoe construction. As it is preferred that two of the brackets 47 be provided for each stem or shaft 35, it is apparent that said shafts or stems may be slidably supported in horizontal manner for linear movement by the brake operating means.

Each of the brake constructions 25 and 26 has a web portion 35$^a$ extending radially outwardly in horizontal manner between the side shoe sections 37 and 38. In order to maintain the side shoe sections 37 and 38 of each brake shoe construction in proper relation, a supporting member 53 is provided, having at one end thereof outwardly extending legs 54, which are connected upon the square shafts or pins 55; said shafts or pins 55 being connected as by bracket clips 56 to the shoe sections 37 and 38. The shoe sections 37 and 38 are laterally slidable upon the shaft 55, and it is preferred that compression springs 57 be provided at the inside surfaces of the legs 54, normally engaging the same and the bracket clips 56 whereby the brake shoe sections 37 and 38 may be forced toward each other and toward the web 35$^a$ therebetween. The member 53 also provides an extension portion 60 having a square opening 61 therein through which the stem 35 slidably extends.

It is obvious that upon the inward movement of the square shaft or stem 35 that the inner brake shoe section 30 be moved into engagement with the brake wheel 15. To provide for the lateral expansion of the brake shoe sections 37 and 38 into engagement with the brake wheel 15, it is preferred to provide anti-friction rollers 65 upon opposite sides of the web 35$^a$, which may operate upon inwardly converging surfaces 67 provided at the sides of the shoe sections 37 and 38 which face said anti-friction members 65, so that as the stem 35 is moved inwardly the rollers engaging the converging surfaces 67 will move the two sections 37 and 38 relatively away from each other and from the stem 35 into engagement with the converging sides 17 and 18 of the brake wheel 15. So that the brake shoe sections will maintain a definite relation with respect to each other and with respect to the brake wheel, it is preferred to provide ferrules or collars 70 and 71 upon each square shaft 35; the collar 70 being attached outwardly of the bracket member 53, while the collar or ferrule 71 is attached immediately below said member 53 and is adapted for contact thereagainst. Intermediate the extension portion 60 of the bracket 53 and the outer ferrule or collar 70 a spiral compression spring 74 is provided, which normally acts to force the bracket or supporting member 53 into engagement with the inner collar 71, so that the two sections 37 and 38 may be maintained in a definite relation when the same are not applied in frictional engagement with the brake wheel. Spiral compression springs 77 may be provided intermediate the brake shoe section 30 and the other sections 37 and 38 to maintain said sections in a definite relation so that there will be very little noise during release of the brakes, said springs tending to buff the brake release action.

Referring to the operating mechanisms 27 and 28 for the brake shoe constructions of a brake wheel 15, each of said operating mechanisms includes a shaft 80 rotatably supported by bracket arms 81 carried outwardly of the spider arms 46; each of said shafts 80 having a pinion 82 at the end thereof in meshing relation with the rack teeth 36 which are provided upon a sliding stem or shaft 35. The shafts 80 extend at right angles to the plane of the traction wheel, inwardly of the supporting spider 45, and are suitably connected for operation to the other details of the operating mechanisms 27 and 28. As to the operating mechanism 27 for control of the most forward brake shoe constructions 25, the same may include a shaft 90 transversely carried by the vehicle to which the brake is attached, and having at the ends thereof suitable link lever connections 91 which extend to the pinion shafts 80. The rocker shaft 90 may be connected for operation by any control rod 91 extending to the driver's compartment of the vehicle. Similarly, the operating mechanism 28 contemplates the provision of a transverse rocker shaft 93 having the ends thereof connected by suitable link and lever devices 94 to the inner ends of the pinion shafts 80 provided for the rearward brake constructions 26. The rocker shaft 93 may be connected for operation by any control rod 95 extending to the driver's compartment of the vehicle. As is illustrated in Figure 1, the arrows indicate movement of the operating mechanisms for an application of the brake constructions 25 and 26.

Referring to the operation of this invention, if it is desired to apply both brake constructions of each brake wheel 15, it is necessary to so rotate the pinion shafts 80 that the pinions thereon in meshing relation with the rack teeth of the square shafts 35 will move the latter inwardly toward the brake wheels 15. This will, of course, frictionally force the inner brake shoe sections 30 of the shoe constructions 25 and 26 into engagement with the inner surfaces of the brake wheel groove 16. This movement will also cause the anti-friction rollers 65 to engage the converging surfaces 67 of the brake shoe sections 37 and 38 to relatively move said sections 37 and 38 into frictional engagement with the converging sides 17 and 18 of the brake wheel 15. It is thus obvious that a maximum frictional contact of the brake shoe construction upon the brake wheel has been made which will effectively provide the desired braking upon the vehicle wheels B.

Various changes in the shape, size and arrangement of parts may be made to the form of invention herein shown and described, without departing from the spirit of this invention or the scope of the claims.

I claim:

1. A brake comprising a grooved brake wheel, and a laterally expansible brake shoe device operable in the groove of said brake wheel.

2. A brake comprising a brake wheel, a multipart brake shoe, and means for relatively moving the parts of the brake shoe into engagement with the brake wheel.

3. A brake comprising a grooved brake wheel, a shoe of a plurality of parts operating within the groove of the brake wheel at opposite sides of said groove, and means for relatively moving the parts of the brake shoe within said groove for frictionally engaging the sides of said groove.

4. A brake comprising a brake wheel, a brake shoe operating in the wheel composed of a plurality of parts, and means operating intermediate said parts of the shoe whereby they may be moved away from each other to lock the shoe within said wheel.

5. A brake comprising a brake wheel having a circumferential groove therein, a brake shoe construction including a pair of sections lying in the groove at opposite sides thereof, and operating means between said sections for laterally expanding the same into engagement with the sides of said groove.

6. A brake comprising a brake wheel having a circumferential groove therein, a brake shoe construction including a pair of sections operating within said groove of the brake wheel, an operating member radially movable with respect to the wheel between said sections, and anti-friction means carried by said member for engagement with the said brake shoe sections whereby said sections may be relatively moved into engagement with said brake wheel upon radial movement of said operating member.

7. A brake comprising a brake wheel, a brake shoe construction, a shaft connected to the shoe construction including a rack and operating means including a pinion intermeshing with said rack whereby the shoe construction may be operated into expansible engagement with the brake wheel upon movement of said shaft.

8. A brake comprising a brake wheel having a groove therein, a shoe construction operating within said wheel including a section acting at the inner portion of the groove, and a pair of sections acting at opposite sides of the groove, and operating means for relatively moving said sections whereby they may be expanded into frictional engagement with their adjacent surfaces of the brake wheel.

9. A brake comprising a brake wheel having a groove therein, a brake shoe construction comprising a section operable radially of the brake wheel in the inner part of the groove of said brake wheel, and a pair of sections operable laterally within the groove of the brake wheel, a member connected to the first mentioned brake shoe section, means connecting said member with the laterally movable sections, and means for operating said member whereby the same may relatively move the brake shoe sections in the relation above described in expansible frictional engagement with the brake wheel.

10. A brake comprising a brake wheel having a substantially V-shaped groove in the outer periphery thereof, a brake shoe construction operable at opposite points in the groove including a plurality of sections, and operating means for laterally and radially expanding the sections of the brake shoe construction within the groove of said wheel.

11. A brake comprising a brake wheel, a sectional brake shoe operating on the brake wheel, a member movable with respect to the sectional brake shoe including anti-friction rollers operating on relatively inclined surfaces of the different parts of the brake shoe construction, and means for moving said member whereby the parts of said shoe may be expanded into said brake wheel.

12. A brake comprising a brake wheel having a substantially V-shaped groove about the periphery thereof, brake shoe constructions mounted at diametrically opposed points in the groove of said wheel, and rack and pinion operating means for expanding or releasing said brake shoe construction in the groove of said brake wheel.

13. A brake of the class described comprising a brake wheel having a peripheral groove therein, a supporting spider carried adjacent said brake wheel, a shaft slidably carried by said spider radially movable with respect to said wheel, a shoe carried rigid with said slidable shaft adapted for frictional engagement within the groove of said brake wheel, brake shoes yieldably carried within said groove on opposite sides of said slidable shaft, and means movable with the slidable shaft operating on converging surfaces of the shoes at opposite sides of said shaft whereby upon radial inward movement of the shaft all of the brake shoes may be expanded into engagement with the brake wheel.

14. A brake comprising a brake wheel having a peripheral groove substantially V-shaped in cross section about the periphery thereof, a supporting frame carried in stationary manner adjacent said wheel, shaft members supported in sliding manner by said frame for radial inward or outward movement with respect to said brake wheel, a shoe section fixedly carried by said shaft adapted for frictional braking relation with the inner part of the groove of said brake wheel, brake shoe sections within said V-shaped groove at opposite sides of the sliding shaft, means resiliently connecting said side shoe sections to said sliding shaft, said sliding shaft having rack teeth upon the outer end thereof, a pinion in meshing relation with said rack teeth, and operating means for said pinion whereby the sliding shaft may be moved inwardly or outwardly with respect to said brake wheel whereby the brake shoe sections may be expanded into frictional engagement with the brake wheel or released therefrom.

JOSEPH A. MYRICK.